Patented Aug. 6, 1935

2,010,686

UNITED STATES PATENT OFFICE 2,010,686

PROCESS FOR THE RECOVERY OF ALCOHOLS

Franklin A. Bent and Russell W. Millar, Berkeley, Calif., assignors to Shell Development Company, San Francisco, Calif., a corporation of Delaware No Drawing. Application January 24, 1934, Serial No. 708,054

10 Claims. (Cl. 260—156)

This invention relates to a process for the recovery of alcohols prepared from olefines in the gaseous or vaporous state, and more particularly is concerned with their recovery from systems wherein the olefines are catalytically hydrated to the corresponding alcohols.

The exit gases from any apparatus in which olefines in the gaseous or vaporous state are catalytically hydrated to alcohols, other than by absorption and hydrolysis, contain alcohol or alcohols, water vapor, unconverted olefine or olefines, and if pure olefin or olefines were not used at the start, a diluent, which in most cases comprises one or more paraffine hydrocarbons.

The gaseous mixture issuing from the catalytic chamber is substantially totally condensed, whereupon two liquid phases are formed. In those cases where the alcohols are substantially water-soluble, such as ethyl, isopropyl and the secondary butyl alcohols, the lower or aqueous phase contains substantially all of the water, a predominating quantity of the alcohol or alcohols, and, at times, a small amount of dissolved and/or entrained hydrocarbon. The upper or hydrocarbon phase contains substantially all of the hydrocarbon, a minor quantity of the alcohol or alcohols and, at times, a small quantity of water. The aqueous phase is separated from the hydrocarbon phase and the former distilled to yield as distillate a constant boiling mixture of alcohol and water. In lieu of distillation, one may selectively absorb the alcohol or alcohols from the aqueous phase and fractionate the absorption solution to recover a mixture of or individual alcohols. Alternatively, the aqueous phase may be utilized after substantial dehydration as reactant material for esterification, etherification, alkylation, halogenation, halohydrination and other processes. The hydrocarbon phase is returned to the same catalytic chamber or introduced in another one in series, with or without additional fresh hydrocarbon material, preferably of high olefine content. In a continuous operation, the hydrocarbon phase is preferably introduced in a catalytic chamber in series with the first, and the process repeated until the available olefine content is substantially depleted. Where batch operations are resorted to, the hydrocarbon phase is preferably returned to the catalytic chamber for conversion of more of the olefine to alcohol. When the olefine content of the hydrocarbon phase has been decreased to any desired extent, the hydrocarbon phase is withdrawn from the system and replaced by fresh hydrocarbon of any convenient olefine content.

We have found that the hydrocarbon phase of the condensate appears, when starting with a fresh charge of hydrocarbon, to contain an appreciable, though minor, quantity of alcohol and that the aqueous phase is relatively rich in alcohol. As olefine is removed from the hydrocarbon phase, the alcohol content of both subsequent phases is decreased, the rate of decrease in the hydrocarbon phase being more rapid than in the subsequent aqueous phase, until at the end the hydrocarbon phase contains, at the most, only an inappreciable fraction of the total alcohol.

The water remaining after distillation of the boiling mixture of alcohol and water from the aqueous phase or after selective absorption of the alcohol content, contains only very small amounts or traces of alcohol and may be introduced into any of the catalytic chambers. In this way, substantially all the alcohol made may be recovered.

In those cases where olefines containing five, six, seven and more carbon atoms to the molecule are utilized, their corresponding alcohols are substantially immiscible with water. Hence, a predominating quantity of alcohol will be contained in the hydrocarbon phase. The alcohol content may be fractionated off by distillation or may be selectively absorbed in a suitable solvent from which they may be recovered. The alcohol content may be caused to participate in any one of the above enumerated reactions. In any case, the resulting hydrocarbon raffinate or residue may then be introduced into any one of the catalytic chambers. The aqueous phase may or may not have its alcohol content substantially reduced prior to introduction into a catalyst chamber depending on the quantity of alcohol present. Where a complex mixture of olefines is used resulting in the formation of both water-soluble and water-insoluble alcohols, then it is desirable to reduce the alcohol content of both phases.

Whether one operates with lower or higher olefines, it is desirable that the aqueous phase be substantially removed from the separating chamber located after the condensing system, in order that the proper distribution of alcohol be attained.

As starting material, one may operate with pure olefine or admixtures thereof. Instead of pure compounds, one may work with impure individual compounds or their admixtures such as occur in the cracking or pyrolytic treatment of petroleum products and other natural carboniferous materials. Suitabe fractions may be employed such as paraffin and olefine hydrocarbons consisting predominantly of the same number of carbon atoms to the molecules, such as a propane-propene, butane-butylene, pentane-amylene, hexane-hexylene fraction and the like. Where desired, the tertiary olefine content may be first selectively removed prior to hydration of the normal or secondary olefines in any manner known to the art. Not only normally gaseous olefines but normally liquid olefines may be used, the latter being vaporized either before or in the catalytic chamber.

The process is not limited to any specific catalytic operation and may be used where solid as well as liquid hydrating catalysts are resorted to, such as oxides, sulfates, phosphates, halides, acid sulfates, sulfuric acid, phosphoric acid, and the like.

The following examples are cited for illustrative purposes only:

*Example I*

A mixture of propylene and propane containing 35% propylene was passed at a pressure of 3000 pounds per square inch through a solution containing 2.3 grams of zinc sulfate per 100 grams of water at 285° C. The exit gas was totally condensed at 20° C. and run into a separator maintained at the vapor pressure of the mixture at room temperature. Two liquid phases appeared; the lower layer contained 80% of the total alcohol made and consisted of 7% isopropyl alcohol and 93% water, together with a small amount of dissolved hydrocarbons. The upper phase contained propane, unconverted propylene, and 20% of the total alcohol made, or 1.75% isopropanol. The aqueous alcohol made was drawn off and the hydrocarbon phase was returned to the catalyst chamber, this process being carried on continuously until the concentration of propylene in the mixture of propylene and propane had fallen to 5%. The hydrocarbon then contained practically no alcohol, and the average concentration of alcohol in the accumulated aqueous layer was 3.4%.

*Example II*

The process of Example I was carried out with a mixture of propylene and propane containing initially 30% propylene and a catalyst consisting of 5% sulfuric acid in water at 225° C. The final concentration of the propylene was 4%, and the concentration of the accumulated aqueous alcohol was 10%. At the end, the hydrocarbon contained only traces of isopropyl alcohol.

While we have in the foregoing described in some detail the preferred embodiment of our invention and some variants thereof, it will be understood that this is only for the purpose of making the invention more clear and that the invention is not to be regarded as limited to the details of operation described, nor is it dependent upon the soundness or accuracy of the theories which we have advanced as to the reasons for the results attained. On the other hand, the invention is to be regarded as limited only by the terms of the accompanying claims, in which it is our intention to claim all novelty inherent therein as broadly as is possible in view of the prior art.

We claim as our invention:

1. In a process for the catalytic hydration of an olefine in the gaseous state wherein an effluent gas mixture containing alcohol issues from a catalyst chamber, the steps which comprise condensing and stratifying the effluent gas mixture into an aqueous phase and a hydrocarbon phase, substantially removing the aqueous phase from the hydrocarbon phase and introducing the hydrocarbon phase containing a minor quantity of alcohol into a hydrating catalyst chamber.

2. In a process for the catayltic hydration of an olefine in the gaseous state wherein an effluent gas mixture containing essentially water-soluble alcohol issues from a catalyst chamber, the steps which comprise condensing and stratifying the effluent gas mixture into an aqueous phase containing the major quantity of alcohol and a hydrocarbon phase, substantially removing the aqueous phase from the hydrocarbon phase and introducing the hydrocarbon phase into a hydrating catalyst chamber.

3. In a process for the catalytic hydration of an olefine in the gaseous state wherein an effluent gas mixture containing essentially water-insoluble alcohol issues from a catalyst chamber, the steps which comprise condensing and stratifying the effluent gas mixture into an aqueous phase and a hydrocarbon phase containing the major quantity of the alcohol, substantially removing the aqueous phase from the hydrocarbon phase, substantially removing the alcohol content from the hydrocarbon phase and introducing the resulting hydrocarbon phase into a hydrating catalyst chamber.

4. In a process for the catalytic hydration of an olefine in the gaseous state wherein an effluent gas mixture containing alcohol issues from a catalyst chamber, the steps which comprise condensing and stratifying the effluent gas mixture into an aqueous phase and a hydrocarbon phase, substantially removing the aqueous phase from the hydrocarbon phase, substantially reducing the alcohol content of the hydrocarbon phase and introducing the resulting hydrocarbon phase into a hydrating catalyst chamber.

5. In a process for the catalytic hydration of an olefine in the gaseous state wherein an effluent gas mixture containing alcohol issues from a catalyst chamber, the steps which comprise condensing and stratifying the effluent gas mixture into an aqueous phase and a hydrocarbon phase, substantially removing the aqueous phase and substantially reducing the alcohol content thereof and subsequently introducing both phases into a hydrating catalyst chamber.

6. In a process for the catalytic hydration of propylene in the gaseous state wherein an effluent gas mixture containing isopropyl alcohol issues from a catalyst chamber, the steps which comprise condensing and stratifying the effluent gas mixture into an aqueous phase and a hydrocarbon phase, substantially removing the aqueous phase from the hydrocarbon phase, and introducing the hydrocarbon phase into a hydrating catalyst chamber.

7. In a process for the catalytic hydration of butylene in the gaseous state wherein an effluent gas mixture containing secondary butyl alcohol issues from a catalyst chamber, the steps which comprise condensing and stratifying the effluent gas mixture into an aqueous phase and a hydrocarbon phase, substantially removing the aqueous phase from the hydrocarbon phase, and introducing the hydrocarbon phase into a hydrating catalyst chamber.

8. In a process for the catalytic hydration of amylene in the vaporous state wherein an effluent gas mixture containing secondary amyl alcohol issues from a catalyst chamber, the steps which comprise condensing and stratifying the effluent gas mixture into an aqueous phase and a hydrocarbon phase, substantially removing the aqueous phase from the hydrocarbon phase, substantially reducing the secondary amyl alcohol content of the hydrocarbon phase and introducing the resulting hydrocarbon phase into a hydrating catalyst chamber.

9. In a process for the catalytic hydration of an olefine in the gaseous state wherein an effluent gas mixture containing alcohol issues from a catalyst chamber, the steps which comprise condensing and stratifying the effluent gas mixture into an aqueous phase and a hydrocarbon phase, substantially removing the aqueous phase from the hydrocarbon phase, substantially reducing the alcohol content of the hydrocarbon phase and subsequently introducing both phases into a hydrating catalyst chamber.

10. In a process for the catalytic hydration of an olefine in the gaseous state wherein an effluent gas mixture containing alcohol issues from a catalyst chamber, the steps which comprise condensing and stratifying the effluent gas mixture into an aqueous phase and a hydrocarbon phase, substantially removing the aqueous phase and substantially reducing the alcohol content thereof, substantially reducing the alcohol content of the hydrocarbon phase and subsequently introducing both phases into a hydrating catalyst chamber.

FRANKLIN A. BENT.
RUSSELL W. MILLAR.